(12) United States Patent
Yasuo et al.

(10) Patent No.: US 6,503,650 B1
(45) Date of Patent: Jan. 7, 2003

(54) FUEL CELL SYSTEM

(75) Inventors: Takashi Yasuo, Hirakata (JP); Yasuo Miyake, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 67 days.

(21) Appl. No.: 09/607,119

(22) Filed: Jun. 29, 2000

(30) Foreign Application Priority Data

Jun. 30, 1999 (JP) ............................................ 11-186614

(51) Int. Cl.⁷ .................................................. H01M 8/04
(52) U.S. Cl. ............................. 429/26; 429/22; 429/23; 429/34; 429/39
(58) Field of Search .......................... 429/22, 25, 26, 429/34, 38, 39, 23

(56) References Cited

U.S. PATENT DOCUMENTS

| | | | |
|---|---|---|---|
| 3,553,023 A | * 1/1971 | Doyle | .................. 429/22 X |
| 4,640,873 A | 2/1987 | Tajima et al. | ............... 429/24 |
| 5,935,726 A | * 8/1999 | Chow et al. | .............. 429/22 X |
| 5,958,613 A | 9/1999 | Hamada et al. | ............. 429/26 |
| 6,083,638 A | 7/2000 | Taniguchi et al. | ........... 429/34 |
| 6,322,914 B1 | * 11/2001 | Chow et al. | .............. 429/22 X |

FOREIGN PATENT DOCUMENTS

| | | | |
|---|---|---|---|
| JP | 57-138780 A | 8/1982 | ............ H01M/8/04 |
| JP | 2-304872 | * 12/1990 | ............ H01M/8/04 |
| JP | 6-089730 A | 3/1994 | ............ H01M/8/04 |
| JP | 6-203861 | * 7/1994 | ............ H01M/8/04 |

* cited by examiner

Primary Examiner—Stephen Kalafut
(74) Attorney, Agent, or Firm—Merchant & Gould P.C.

(57) ABSTRACT

A fuel cell system, comprising: (A) a cell multilayer element that is formed by stacking unit cell structures in layers, a unit cell structure including: a cell that includes a cathode, an anode, and electrolyte sandwiched between the cathode and the anode an oxidant channel unit with a plurality of oxidant channels that cross the cathode and enable oxidant to be supplied to the cathode; and a fuel channel unit with a plurality of fuel channels that cross the anode and enables fuel to be supplied to the anode; (B) oxidant supplying means for supplying the oxidant to the oxidant channels; and (C) fuel supplying means for supplying the fuel to the fuel channels, wherein the oxidant supplying means includes first switching means for reversing a flow direction of the oxidant in at least one of the oxidant channels and/or the fuel supplying means includes second switching means for reversing a flow direction of the fuel in at least one of the fuel channels.

12 Claims, 12 Drawing Sheets

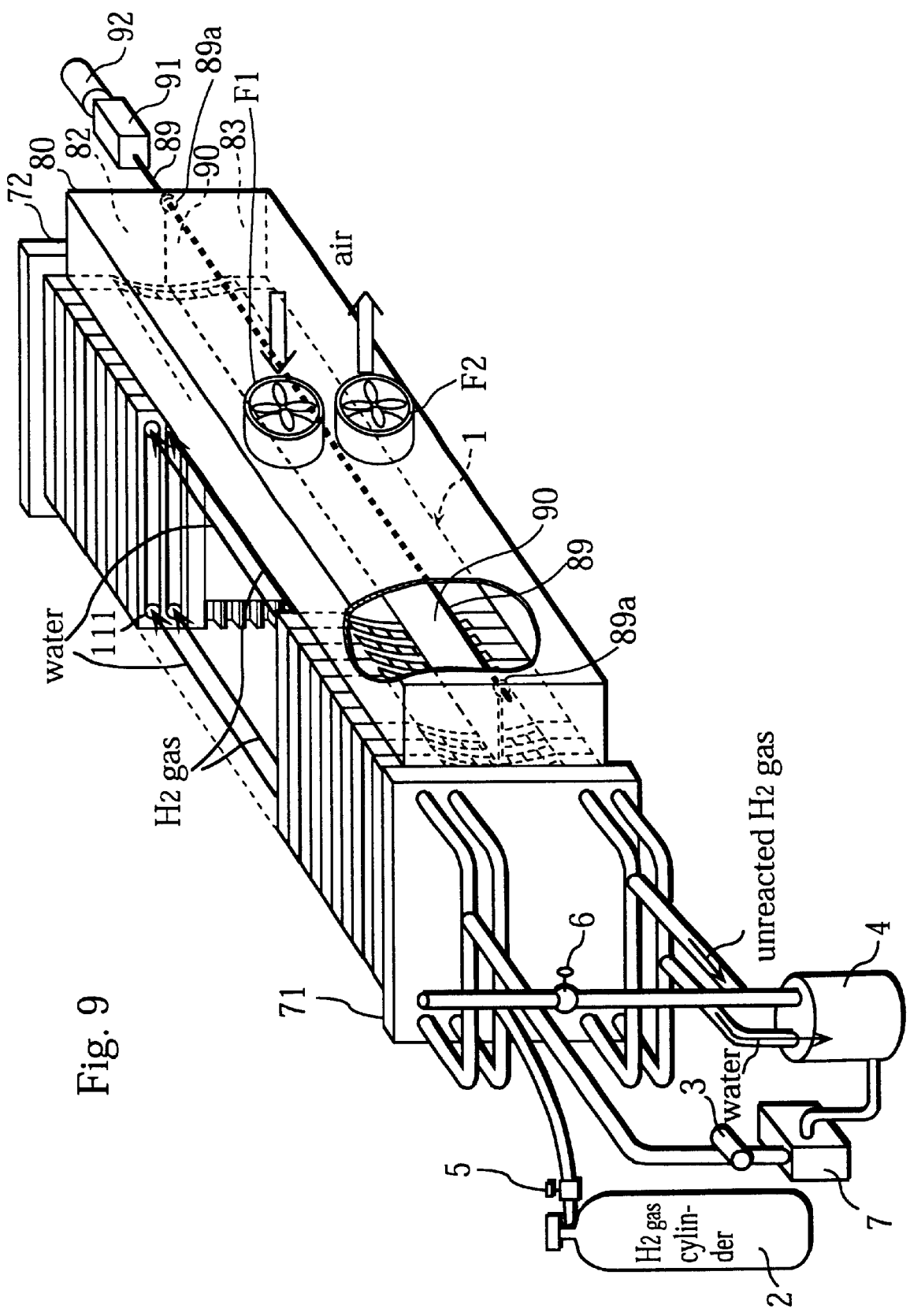

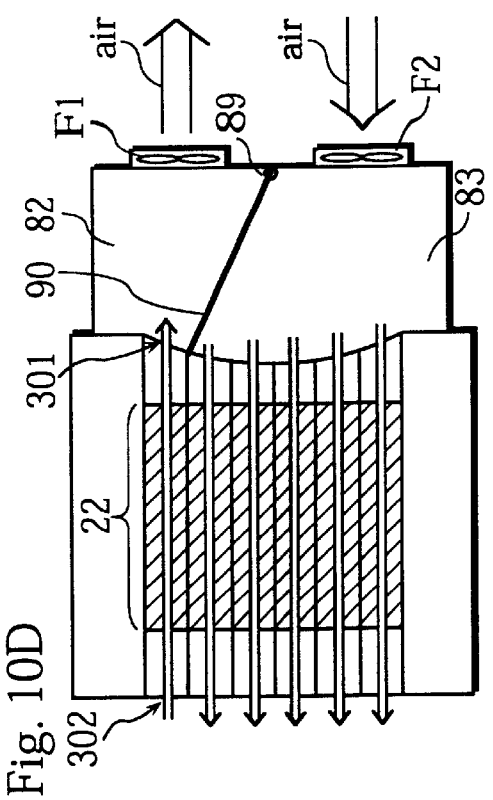
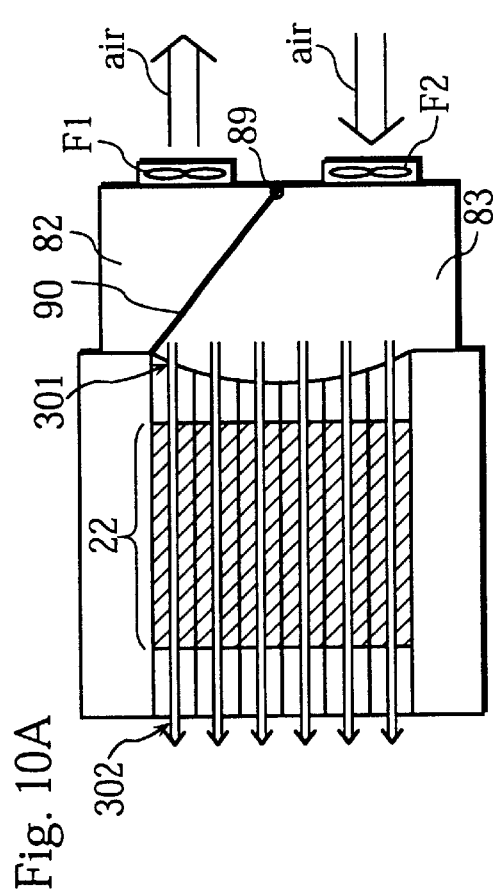
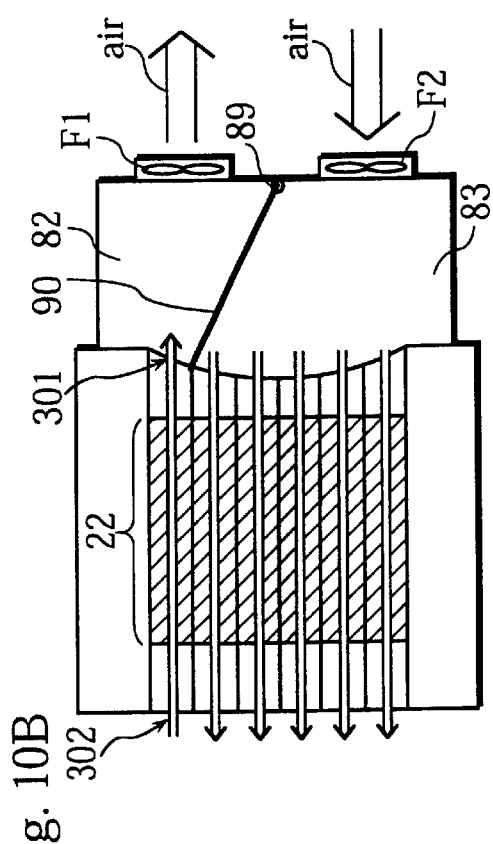

FUEL CELL SYSTEM

This application is based on an application No. 11-186614 filed in Japan, the content of which is hereby incorporated by reference.

BACKGROUND OF THE INVENTION

(1) Field of the Invention

The present invention relates to a fuel cell system, especially to a system in which electricity is generated by reversing the flow direction of the fluid in the oxidant channel and/or the fuel channel.

(2) Relate Art

Generally, power generation system using the fuel cell reaction (fuel cell system) mainly includes a cell multilayer element. The cell multilayer element is cell units stacked in layers. Each of the cell units includes a cell formed by sandwiching a matrix that is an electrolyte membrane or includes electrolyte (referred to an "electrolyte membrane" in this specification) between a cathode and an anode. A cell unit is formed by equipping a cell with oxidant channels for supplying the oxidant to the cathode and fuel channels for supplying fuel to the anode. Also, the fuel cell system includes oxidant means for supplying the oxidant to each of the oxidant channels and fuel means for supplying the fuel to each of the fuel channels.

When a proton conductive substance is used as the electrolyte (polymer electrolyte fuel cell, for instance), the concentration of water generated by the fuel cell reaction is especially high downstream from the oxidant. On the other hand, when an oxide ion conductive substance is used (solid-oxide fuel cell, for instance), the concentration is especially high downstream from the fuel. The retention, especially the condensation of the water can block oxidant and fuel channels to lower the reaction downstream from the channels and eventually the reaction of the cell as a whole. This is problematic. One proposed solution to this problem is a fuel cell in a polymer electrolyte fuel cell system (Japanese Patent Laid-Open Publication No. 06-89730). The fuel cell includes condensed water removal means that further includes a non-humidification oxidant gas supplying unit in the midpoint of the oxidant channel for preventing the condensation of water downstream from the oxidant channel and a water absorber so as not to obstacle the gas flow from the gas supplying unit to a part of the oxidant channel upstream from the gas supplying unit. The fuel cell, however, is still problematic. More specifically, the generated water still retains downstream from the non-humidification oxidant gas supplying unit and the construction is complicated. Another proposed solution to this problem is a fuel cell system (Japanese Patent Publication No. 02-21102). In the fuel cell system, the difference of the temperatures around the entrance and the exit of the oxidant channel is detected and the flow direction of the oxidant is reversed when the temperature difference reaches a predetermined value. This is assumed to be effective to solve the retention of the generated water since the water concentration distribution is uniformized by the uniformization of the temperature distribution due to the reverse of the flow direction of the oxidant in the cell.

According to the fuel cell system, however, the flow direction of the oxidant is reversed in the cell multilayer element as a whole, so that the flow of the oxidant is temporarily unstable in the cells when the flow direction is switched at the time of electricity generation. As a result, the output voltage drastically decreases at the time of the switch of the flow direction and the life is shortened.

SUMMARY OF THE INVENTION

It is accordingly an object of the present invention to provide a fuel cell system in which the channels are prevented from being blocked by the condensed water while the voltage decrease is prevented as less as possible when the flow directions of the oxidant and fuel are reversed.

The above-mentioned object may be achieved by a fuel cell system that includes: (A) a cell multilayer element that is formed by stacking unit cell structures in layers, a unit cell structure including: a cell that includes a cathode, an anode, and electrolyte sandwiched between the cathode and the anode an oxidant channel unit with a plurality of oxidant channels that cross the cathode and enable oxidant to be supplied to the cathode; and a fuel channel unit with a plurality of fuel channels that cross the anode and enables fuel to be supplied to the anode; (B) an oxidant supplying unit for supplying the oxidant to the oxidant channels; and (C) a fuel supplying unit for supplying the fuel to the fuel channels, wherein the oxidant supplying unit includes a first switching unit for reversing a flow direction of the oxidant in at least one of the oxidant channels and/or the fuel supplying unit includes a second switching unit for reversing a flow direction of the fuel in at least one of the fuel channels.

Here, the fuel cell system, wherein the oxidant supplying unit includes: a first oxidant supplier for supplying the oxidant to a first oxidant channel group that includes at least one of the plurality of oxidant channels; and a second oxidant supplier for supplying the oxidant to a second oxidant channel group that is the plurality of oxidant channels excluding the first oxidant channel group, and the first switching unit independently reverses a direction in which the first oxidant supplier supplies the oxidant to the first oxidant channel group and a direction in which the second oxidant supplier supplies the oxidant to the second oxidant channel group.

Here, the fuel cell system, wherein the first oxidant supplier includes: a first fan; and a first connecting passage for forming an airway between the first fan and the first oxidant channel group, the second oxidant supplier includes: a second fan; and a second connecting passage for connecting the second fan to the second oxidant channel group, and the first switching unit independently reverses a direction of an air current generated by the first fan and a direction of an air current generated by the second fan.

Here, the fuel cell system, wherein the first and second connecting passages are formed by partitioning a space inside of an external manifold with a dividing element.

Here, the fuel cell system, wherein the dividing element is provided with a water-absorbing element.

Here, the fuel cell system, wherein the oxidant supplying unit includes: a first oxidant supplier for supplying the oxidant to a first oxidant channel group that is at least one of the plurality of oxidant channels; and a second oxidant supplier for supplying the oxidant to a second oxidant channel group including all the plurality of oxidant channels that are not in the first oxidant channel group, and the first switching unit reverses the flow direction of the oxidant in at least one of the oxidant channels by changing composition of the first and second oxidant channel groups.

Here, the fuel cell system, wherein the first oxidant supplier includes: a first fan; and a first connecting passage for forming an airway between the first fan and the first oxidant channel group, the second oxidant supplier includes: a second fan; and a second connecting passage for connecting the second fan to the second oxidant channel group, and the first switching unit reverses the flow direction of the oxidant in at least one of the oxidant channels by changing volumes of the first and second connection passages.

Here, the fuel cell system, wherein the first and second connecting passages are formed by partitioning a space inside of an external manifold with a dividing element, and the first switching unit changes the volumes of the first and second connection passages by moving the dividing element.

Here, the fuel cell system, wherein the dividing element is provided with a water-absorbing element.

Here, the fuel cell system, wherein the fuel supplying unit includes: a first fuel supplier for supplying the fuel to a first fuel channel group that includes at least one of the plurality of fuel channels; and a second fuel supplier for supplying the fuel to a second fuel channel group that is the plurality of fuel channels excluding the first fuel channel group, and the second switching unit independently reverses a direction in which the first fuel supplier supplies the fuel to the first fuel channel group and a direction in which the second fuel supplier supplies the fuel to the second fuel channel group.

Here, the fuel cell system, wherein the fuel supplying unit includes: a first fuel supplier for supplying the fuel to a first fuel channel group that is at least one of the plurality of fuel channels; and a second fuel supplier for supplying the fuel to a second fuel channel group that is the plurality of fuel channels excluding the first fuel channel group, and the second switching unit reverses the flow direction of the fuel in at least one of the fuel channels by changing composition of the fuel channels in the first and second fuel channel groups.

Here, the fuel cell system, wherein the directions of the air current generated by the first and second fans are reversed and the dividing element is moved according to one of a cell voltage, a temperature of the oxidant at exits of the oxidant channels, a difference between the oxidant temperature at the exits and a cell representative temperature, and a load current.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 6A is a diagrammatic top view of the cell unit;

FIG. 6B is a diagrammatic vertical sectional view taken on line A–A' of FIG. 6A.

FIG. 9 is a perspective view showing the overall structure of and operations by a polymer electrolyte fuel cell system according to the fourth embodiment;

FIGS. 10A to 10D show how the flow direction of air is controlled;

DESCRIPTION OF THE PREFERRED EMBODIMENT

An explanation of embodiments of the fuel cell system according to the present invention will be given below with reference to figures.

(The First Embodiment)

Figure 1:
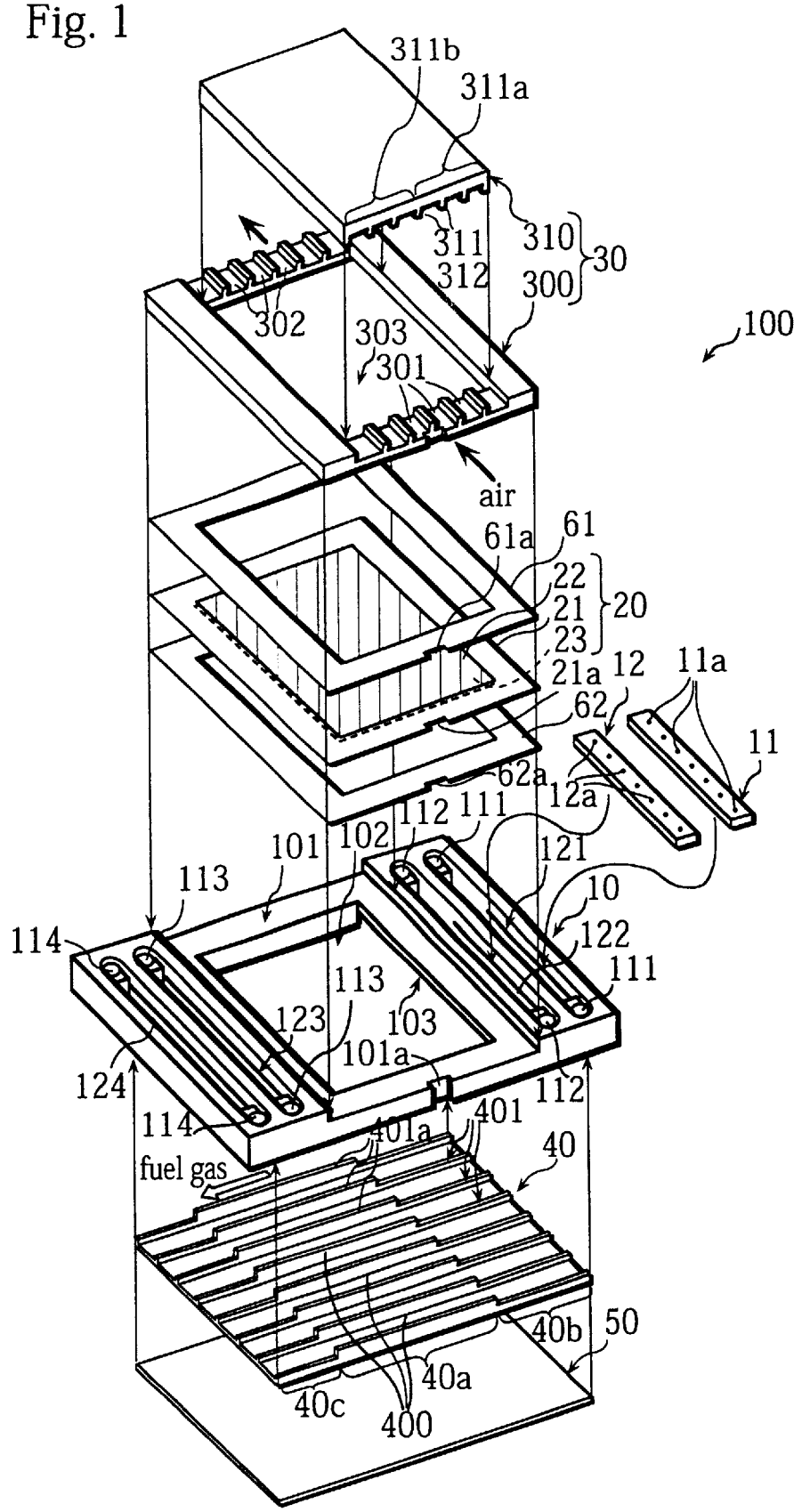
FIG. 1 is a construction drawing showing the structure of a cell unit that is a main component of a polymer electrolyte fuel cell system according to the first embodiment.
Figure 2:
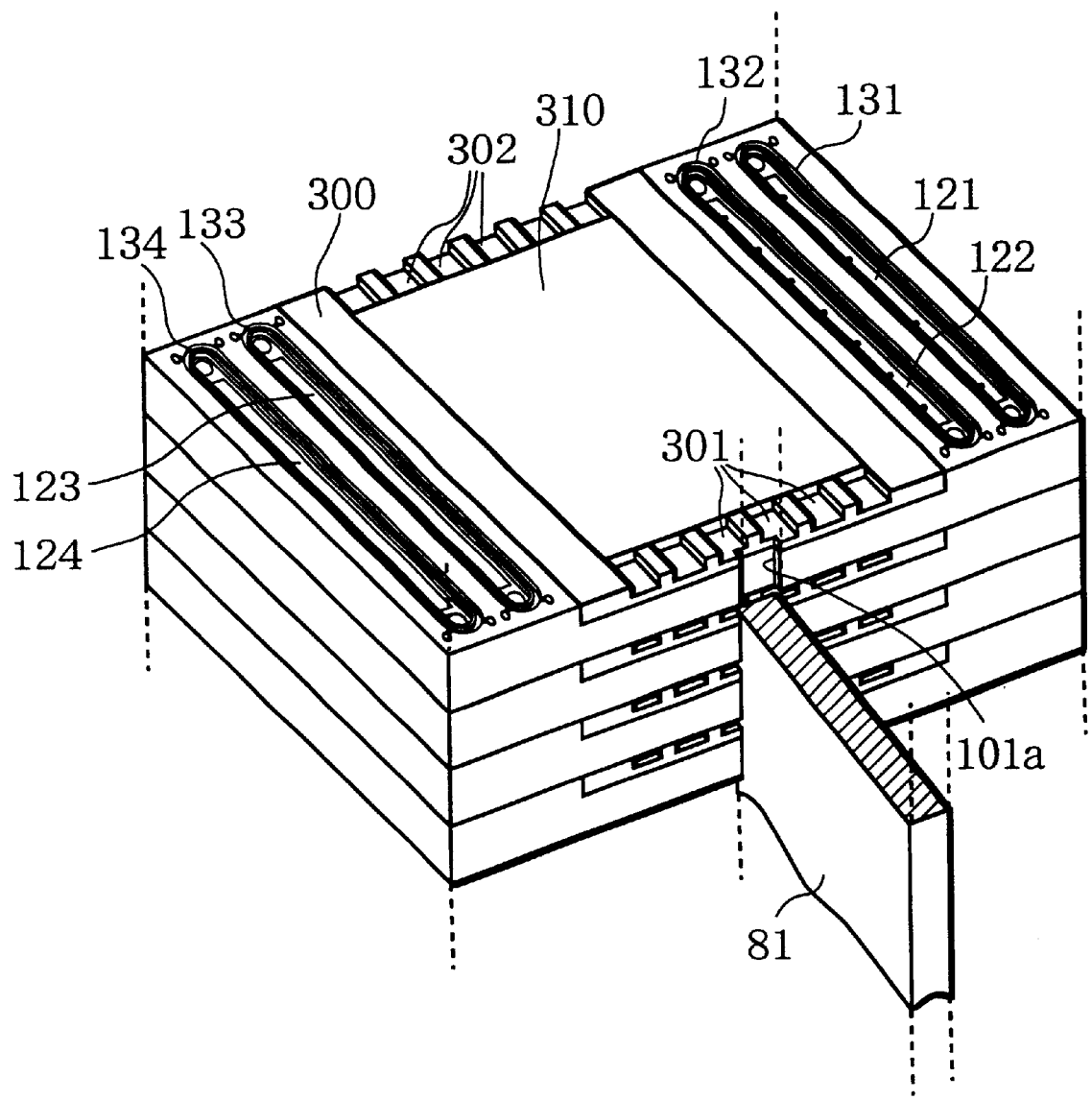
FIG. 2 is an enlarged view of a multilayer element that is cell units stacked in layers.

FIG. 1 is a construction drawing showing the structure of a cell unit 100 that is included in a polymer electrolyte fuel cell system. 1 according to the present embodiment (referred to the "fuel cell 1" in this specification), and FIG. 2 is an enlarged view of the multilayer element that is cell units stacked in layers.

As shown in FIG. 1, the cell unit 100 is manufactured as follows. On one side of a rectangular frame 10 (on the upper side of the frame 10 in FIG. 1), a cell 20, which is a solid polymer film 21 sandwiched between a cathode 22 and an anode 23, is fit via a seal unit 61. On the cell 20, a cathode channel board 30 with a plurality of parallel cathode channels 311 is fit via a seal unit 62. On the other side of the frame 10 (on the lower side of the frame 10 in FIG. 1), an anode channel board 40 with a plurality of parallel anode channels 400 and a dividing plate 50 are fit. Note that the anode 23 is positioned on the back of the solid polymer film 21 and is indicated by dashed line in FIG. 1.

The cell 20 is sandwiched between the cathode channel board 30 and the anode channel board 40. In the anode channels 400, fuel gas flows in the direction indicated by the white arrow in FIG. 1. On the other hand, in the cathode channels 311, air flows in the direction indicated by the bold black arrow in FIG. 1. In this way, electricity is generated in the cell 20. As the fuel gas, hydrogen gas, natural gas whose major constituent is hydrogen gas, and reformed gas such as propane, butane, and methanol can be used.

Figure 3:
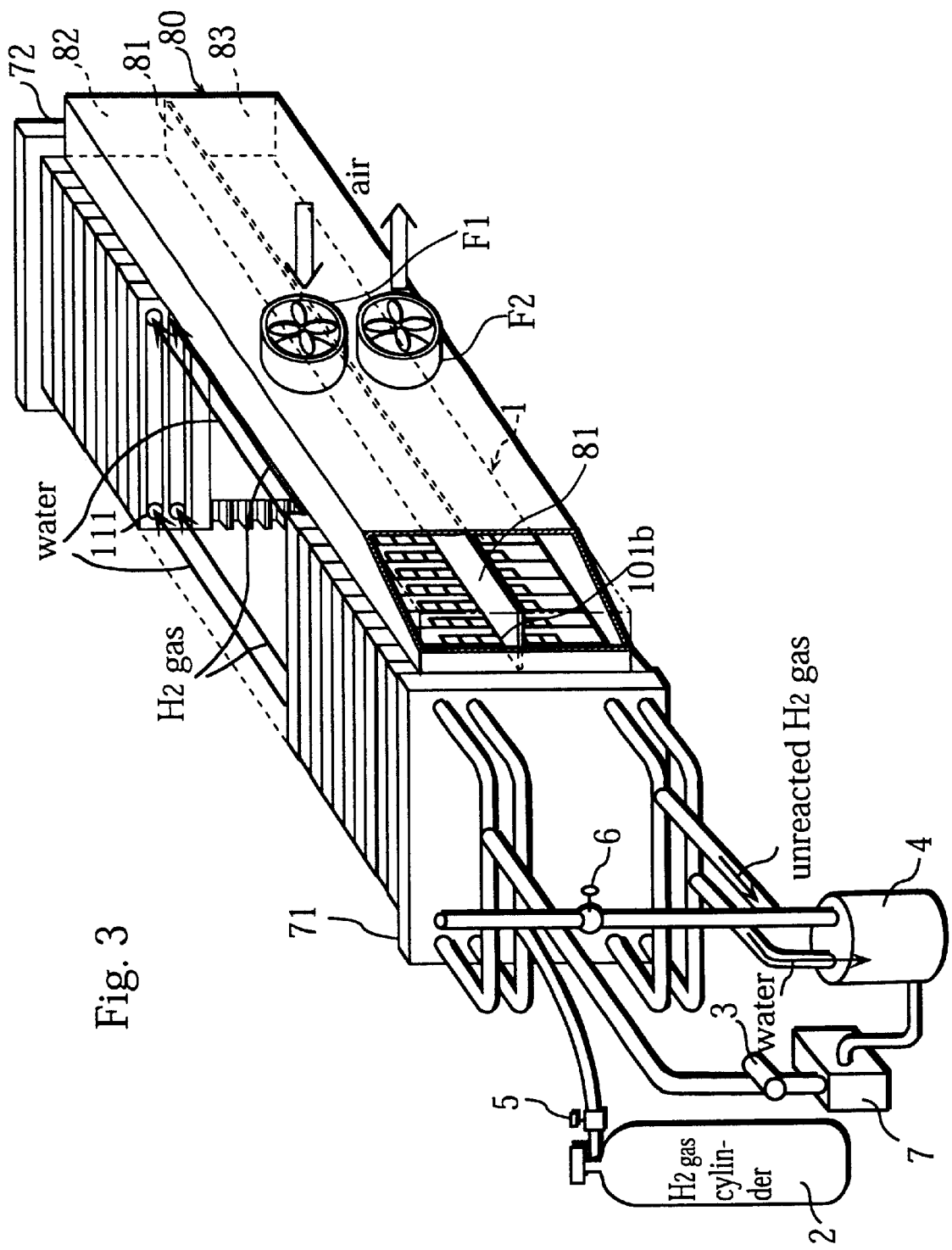
FIG. 3 is a perspective view showing the overall structure of and operations by the polymer electrolyte fuel cell system according to the first embodiment.

The fuel cell 1 is a predetermined number of cell units 100 that are stacked in layers and are sandwiched between a pair of end boards 71 and 72 (not illustrated in FIG. 1, refer to FIG. 3). The frame 10 is a rectangular board. On one side (on the upper side in FIG. 1) of the frame 10, a depressed part 101 is formed in a part corresponding to about the midpoint of the anode channels 400 for fitting the cell 20 and the cathode channel board 30 on the frame 10. On the other side (on the lower side in FIG. 1) of the frame 10, a depressed part 103 is formed for fitting the anode channel board 40 and the dividing plate 50. Further, a window 102 is placed at the center of the depressed part 101 so that the anode channel board 40 comes into contact with the anode 23. The frame 10 is manufactured by the injection molding of the plastic material such as PPS (polyphenylene sulfide) resin, PET (polyester) resin, and modified PPE (polyphenylether) resin.

Note that when the PPS resin and the like is used, the frame 10 has durability great enough to endure a high temperature around 100° C. at the time of power generation.

On one side (on the front side in FIG. 2) of the depressed part 101, the solid polymer film 21, the seal unit 61, and the seal unit 62 of the frame 10, a dividing member 81 is fit for dividing the external manifold space on the cathode side. Depressed parts 101a, 21a, 61a, and 62a are formed.

Also, in a part of the frame 10 corresponding to the upstream of the fuel gas flow direction, a pair of manifold holes 111 for bringing in water, a slit 121 that links to the manifold holes 111 for dividing water among the anode channels 400, a pair of manifold holes 112 for bringing in fuel gas from the outside, and a slit 122 that links to the manifold holes 112 for dividing fuel gas among the anode channels 400 are formed. On the other hand, in a part of the frame 10 corresponding to the downstream of the fuel gas flow direction, a pair of manifold holes 113 for discharging unreacted fuel gas to the outside, a slit 123 that links to the manifold holes 113 for discharging fuel gas from the anode channels 400 to the manifold holes 113, a pair of manifold holes 114 for discharging water to the outside, and a slit 124 that links to the manifold holes 114 for discharging water from the anode channels 400 to the manifold holes 114 are formed.

Note that the slits 121 to 124 are orthogonal to the anode channels 400 and the manifold holes 111 to 114 are formed at the ends of the slits 121 to 124.

The solid polymer film 21 is a perfluorocarbon sulfonic acid membrane. The cathode 22 and the anode 23 are platinum supported on carbon layers having predetermined thickness and are fit to the solid polymer film 21 at the center by hot pressing.

Note that it is preferable to use the alloy catalyst of platinum-ruthenium alloy for the anode 23 when reformed gas is used as the fuel.

The cathode channel board 30 is formed by fitting a channel board main body 310 into a frame 300.

The channel board main body 310 is a plate and a carbon porous element with cathode channels 311 for air flow on the side facing the cathode 22 (on the lower side in FIG. 1).

The frame 300 is a rectangular plastic plate with the window 303 at the center and with air channels 301 and 302 on the side opposite to the cathode 22 (on the upper side in FIG. 1). The air channels 301 are used for bringing air into and the air channels 302 are used for discharging air from the cathode channels 311.

The anode channel board 40 is a rectangular carbon porous element slightly smaller than the frame 10. On the anode channel board 40, the plurality of anode channels 400 are formed in parallel between the ribs 401.

The anode channel board 40 is divided into three parts, i.e., a central part 40a, an upstream part 40b and a downstream part 40c. The central part 40a is positioned about the midpoint of the fuel gas flow direction, and the upstream part 40b and the downstream part 40c are adjacent to the central part 40a. The ribs 401 in the central part 40a (referred to the "ribs 401a in this specification) are higher than in the upstream part 40b and the downstream part 40c. The ribs 401a are fit into the window 102 so as to come into contact with the anode 23 electrically., Not illustrated in FIG. 1, electrode collectors 24 and 25, which are composed of water-repellent carbon papers, are sandwiched between the cathode 22 and the cathode channel board 30 and between the anode 23 and anode channel board 40 (refer to FIG. 6B).

The dividing plate 50 is a airtight glassy carbon plate slightly larger that the anode channel board 40 and is sandwiched between the cathode channel board 30 and the anode channel board 40 so as to bring the cathode channel board 30 and the anode channel board 40 into electrical conduction and to prevent the air flowing in the cathode channels 311 and the fuel gas in the anode channels 400 from being mixed up.

Note that the reference numbers 131 to 134 in FIG. 2 indicate O rings. The O rings are sandwiched between the frames 10 at the O ring grooves (not illustrated) around the manifold holes 111 to 114 and the slits 121 to 124 at the time of manufacturing the fuel cell to seal the manifold holes 111 to 114 and the slit 121 to 124.

FIG. 3 is a perspective view showing the overall structure of and operations by the fuel cell 1. Here, an explanation will be given when hydrogen gas is used as the fuel gas.

As shown in FIG. 3, the fuel cell 1 is positioned so as to set the air channels (the cathode channels 311) in the horizontal direction during the operation.

An external manifold 80 is attached onto one side of the multilayer element for feeding air as oxidant gas into the cathode. In order to divide the external manifold space formed by the external manifold 80 and the exterior wall of the multilayer element into two spaces, i.e., a first manifold space 82 and a second manifold space 83, the dividing member 81 is hung across the external manifold space. More specifically, a part of the outer edge of the dividing member 81 is fit into a dividing element fit part 101b (refer to FIG. 2), which is composed of the depressed part 101a and the like, on the multilayer element of the cell, and the remaining part of the outer edge is fixed to interior walls of the external manifold 80. As a result, the dividing member 81 is positioned in a space adjacent to the cathode channels 311 in the direction of air flow so as to divide the cathode channels 311 into two groups of air channels having the same air flow direction. The two groups are an air channel group 311ba that links to the first manifold space 82 and an air channel group 311b that links to the second manifold space 83 (refer to FIG. 1).

Then, two fans F1 and F2 are disposed on one wall of the external manifold 80 for the first and second manifold spaces 82 and 83. The fans F1 and F2 reverses the direction of air flow. As a result, air that has been differently supplied from the first manifold space 82 and the second manifold space 83 passes through the air channel groups 311a and 311b to supply oxygen to the cathode 22 and is discharged from the air channels 302.

On the other hand, hydrogen gas is supplied to an internal manifold space formed by the manifold holes 112 from a hydrogen gas cylinder 2, water is supplied to an internal manifold formed by the manifold holes 111 from a water pump 3. The supplied water and hydrogen gas are distributed among the cell units 100. In each of the cell units 100, the water and hydrogen flow from the slits 121 and 122 to the upstream part 40b of the anode channel board 40 and through the anode channels 400 to the downstream to supply the hydrogen gas to the anode 23 and keep the solid polymer film 21 moist.

The output from the water pump 3 is controlled so as to keep the water pressure at the slit 121 for water supply at a predetermined value.

The supply pressure of the hydrogen gas is controlled by a regulator 5. Generally, the appropriate supply pressure is 10 to 100,000 $mmH_2O$, especially, 100 to 800 $mmH_2O$. On the other hand, the pressure of unreacted hydrogen that is to be discharged is adjusted by a regulator 6. It is preferable to control the discharge pressure so as to set the fuel utilization ratio in the fuel cell no lower than 90%.

The unreacted hydrogen gas that has passed through the anode channels 400 is discharged from the fuel cell through the slit 123 and the manifold hole 113. On the other hand, water that has passed through the anode channels 400 is discharged from the fuel cell through the slit 124 and the manifold hole 114.

As has been described, the fuel gas and water are separately discharged. As a result, the discharged gas can bypass a separation tank 4 and be directly reused.

The water discharged from the fuel cell 1 and the water that is condensed water vapor included in discharged air are collected in the separation tank 4. The collected water undergoes cooling in a condenser 7 and is supplied to the fuel cell 1 from the water pump 3.

(More-detailed Explanation of Structure and Effects of Upstream Part to Downstream Part of Anode Channels)

In FIG. 1, a water distribution board 11 is fit into the slit 121 for supplying water and a gas distribution board 12 is fit into the slit 122 for supplying gas via O rings (not illustrated).

Each of the water distribution board 11 and the gas distribution board 12 is a rectangular thin board with small holes 11a (12a) is positioned so as to come into contact with the upstream part 40b of the anode channel board 40. The small holes 11a and 12a correspond to the anode channels 400.

For instance, the water distribution board 11 and the gas distribution board 12 are a metal thin plate (stainless steel such as SUS304 and SUS316 and titanium steel) or a ceramic thin plate (such as $Al_2O_3$) in which small holes are bored by etching, or a plastic thin plate (such as polyester resin, ABS (acrylobutadiene-styrene copolymer) resin, PPO (polyphenylene oxide) resin, PPE (polyphenylether) resin, PPS resin) with small holes.

The shape (for instance, circle, ellipse, or polygon), size, and number of the small holes 11a and 12a (one, two, or three for each of the channels) are the same.

It is preferable to set the thickness of the water distribution board 11 and the diameter of the small holes 11a so that appropriate degree of resistance (pressure loss) arises when water passes through the small holes 11a. More specifically, it is preferable to set the thickness at 120 $\mu$m to 5 mm and the diameter at 20 $\mu$m to 3 mm.

Figure 5:
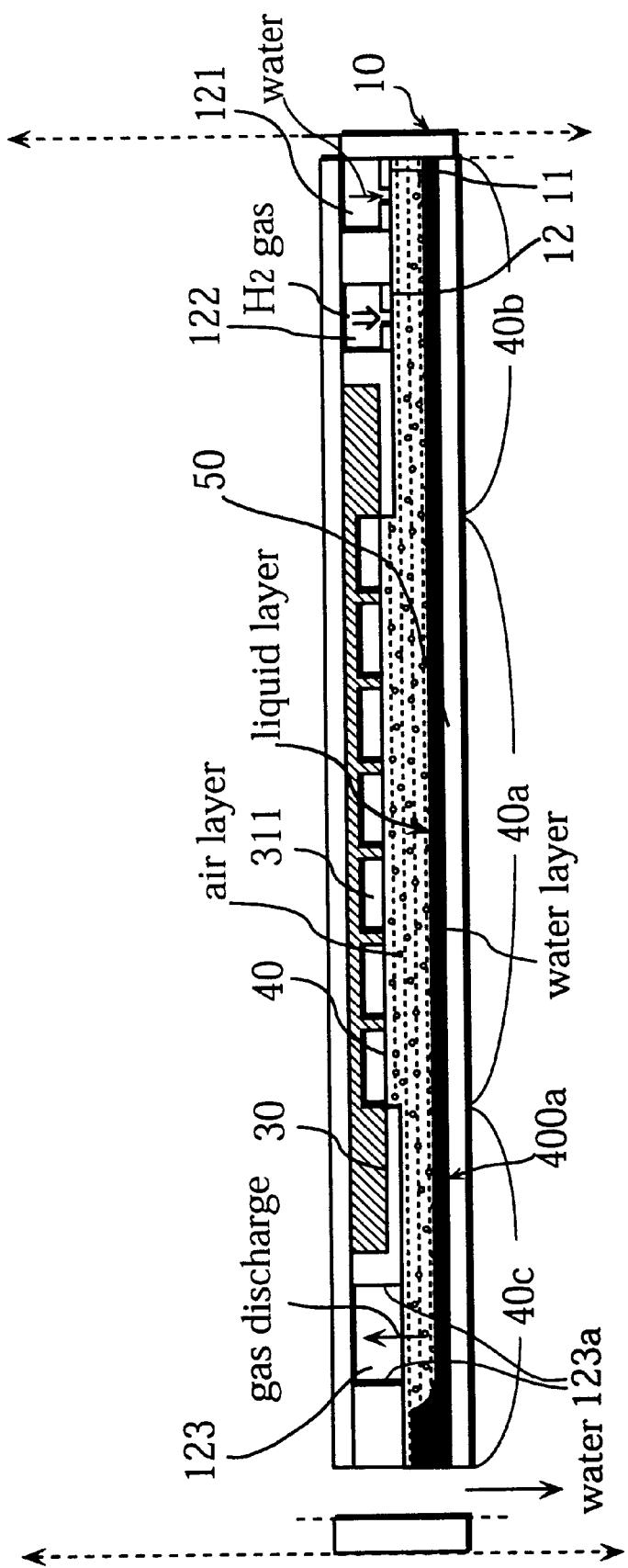
FIG. 5 is a cross section of a substantial part of the polymer electrolyte fuel cell system according to the first embodiment.
Figures 6A, 6B:
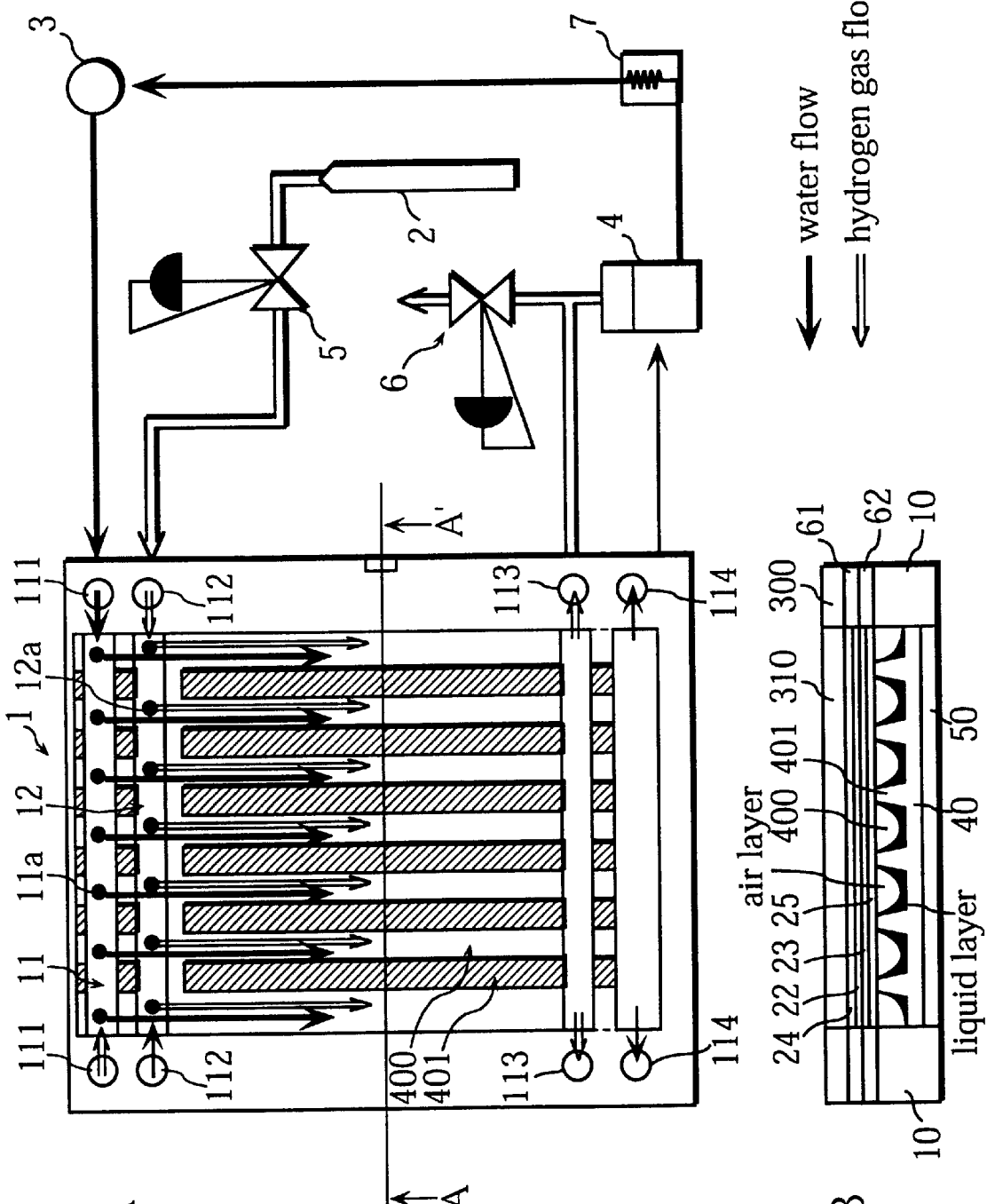
FIGS. 6A and 6B show operations by the polymer electrolyte fuel cell system according to the first embodiment.

FIG. 5 is a cross section of the fuel cell across the water supply channel schematically showing how gas and liquid is mixed, flows and is discharged. FIGS. 6A and 6B show operations by the fuel cell 1. FIG. 6A is a diagrammatic top view of the cell unit 100 and FIG. 6B is a diagrammatic vertical sectional view taken on line A–A' of FIG. 6B.

Water and gas are supplied to the anode channels 400 from the small holes 11a and 12a, respectively to mix the gas and liquid. The mixture of gas and liquid passes through the anode channels 400 to supply gas to the anode and keep the solid polymer film 21. Also, the mixture of gas and liquid serves as the coolant of the fuel cell 1.

The mixture of gas and liquid that has been generated at the upstream part 40b of the anode channels 400 tends to be divided into liquid and air layers when passing through a part corresponding to the cell. More specifically, water is attracted to the anode channel board 40 to form the liquid layer on the anode channel board 40 that mainly includes water and the air layer mainly including fuel gas and water vapor is formed on the node 23 (the electrode collector 25). As a result, fuel as is effectively supplied to the anode 23.

The division of the mixture of gas and liquid ends to be kept downstream from the part corresponding to the cell. As a result, not water in the liquid layer but the air layer faces the slit 123. As a result, selective discharge of gas from the slit 123 is effectively carried out.

On the other hand, water passes through below the gas release hole (the slit 123) downstream and is discharged from the water release hole (slit 124).

(Explanation of Air Flow Direction Control Operations)

Here, an explanation of the operations for controlling the flow direction of air will be given with reference to FIG. 4. Note that the operations described below are comprehensively controlled by a control unit that is not illustrated. The control unit is mainly composed of a CPU, a ROM that stores control parameters and the like (the standard cell voltage, the standard air temperature at the air exit, the function that is defined by the inverse number of the load current in the operations described below), and a RAM that temporarily stores detection values (the detected cell voltages, the detected air temperature at the air exit, the load current in the operations described below).

Figure 4A:
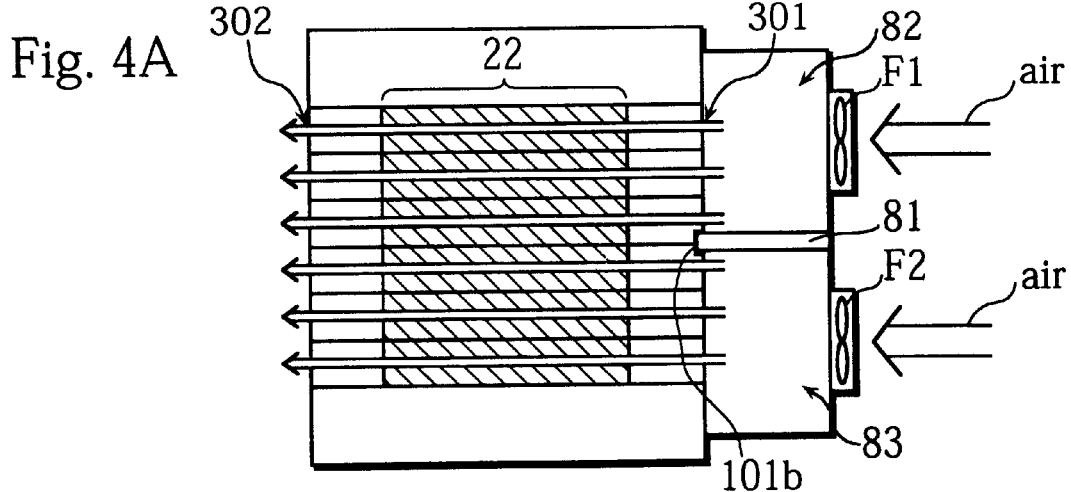
FIGS. 4A to 4C show how the flow direction of air is controlled.
Figure 4B:
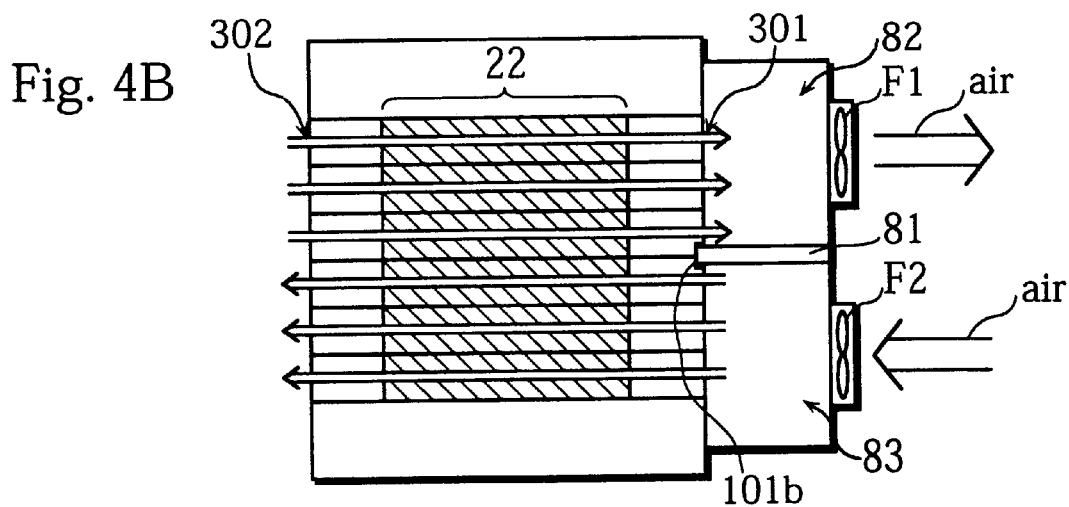
Figure 4C:
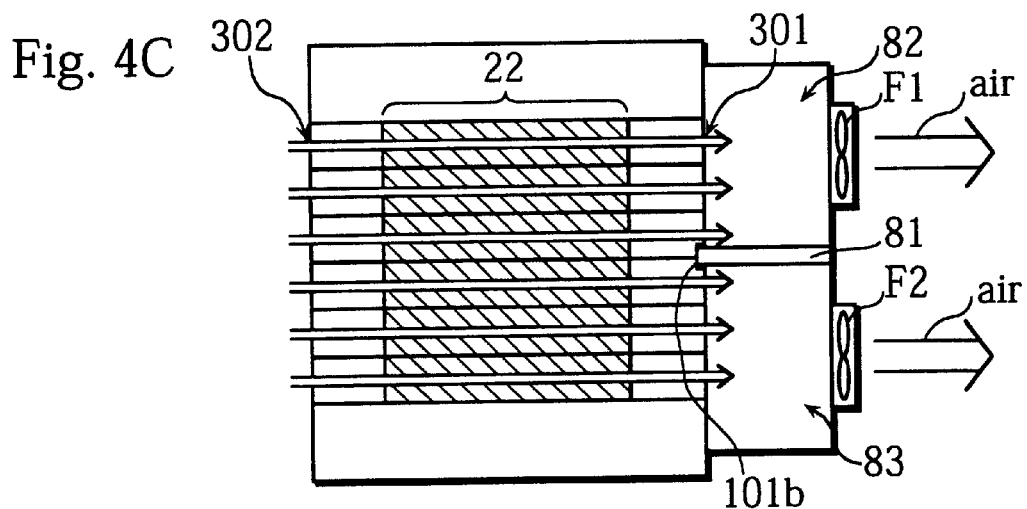

FIGS. 4A to 4C show how the air flow direction is controlled.

During the operation, both of the fans F1 and F2 are driven so as to have air flow from the right to the left as shown in FIG. 4A. Also in the cells, air flows from the right to the left. With the lapse of time, the humidity and temperature increase in the air channels at a part corresponding to the cells. The humidity and temperature are highest around the air exit. Due to the uneven humidity and temperature, the cell voltage begins to decrease. The cell voltage decrease is detected at regular intervals for a predetermined number of cells. When the detected value for any cell is lower than a set value, the driving of the fan F1 is switched so as to have air flow from the left to the right as shown in FIG. 4B. In addition, the driving of the fan F2 is switched so as to have air flow from the left to the right as shown in FIG. 4C according to the detected values of cell voltage. By repeatedly switching the air flow direction, the humidity and temperature in the fuel cell 1 can be kept uniform. As a result, the channels can be prevented from being blocked by water.

A more detailed explanation of how the retention of water can be prevented.

Generally speaking, when air flows in one direction in a fuel cell, air at the air entrance is relatively dry, so that the humidity of air is relatively low around the air entrance. As passing through the fuel cell, air is humidified by water that has been generated by the cell reaction, so that the humidity is highest around the air exit. Also, as passing through the fuel cell, the temperature of air is increased by the heat of the cell reaction, so that the temperature is highest around the air exit. As a result, the high temperature and humidity of air around the air exit tends to cause water retention that blocks the air exit.

On the other hand, when air flow direction is switched, relatively dry and cold air is newly taken in from the air exit where the temperature and humidity of air is high, so that the temperature and humidity can be lowered. In addition, even when water retention begins at the air exit, water can be vaporized by newly taken air and pushed back in the air channels. As a result, the air channels can be prevented from being blocked by water in advance.

Switching the air flow direction bring about other effects as follow.

When the driving of the fan F1 or fan F2 is switched and the direction of air flow in the air channel group (311a or 311b) is reversed as has been described, air temporarily stagnates in the air channel group in which the air flow direction has been reversed and the voltage drops. Unlike the conventional case, however, in which the air flow direction is reversed for all the air channels and air stagnates in all the air channels, air stagnation partially arises according to the present embodiment. As a result, the degree of voltage drop is small.

Here, an explanation of how air stagnation effects the fuel cell will be given.

When air stagnates, air is consumed at one time at a part of a cell to which air is not newly supplied and cell reaction there cannot continue. As a result, load current is concentrated in the remaining part of the cell where air remains. Accordingly, active cell reaction is locally carried out and the temperature locally increases since the cell reaction is a heat reaction. In the worst case, the solid polymer film is broken.

When air frequently stagnates, a large load current is locally passed and the life of the fuel cell is shortened. On the other hand, the air flow direction is reversed not for all the air channels according to the present embodiment. As a result, a relatively small load current is concentrated on a part of a cell and the life is not drastically shortened even if the air flow direction is reversed.

Note that the dividing element in the manifold space is fit into one side of the cell multilayer element in the present embodiment, so that air tightness is secured to some extent. As a result, even when the air pressure in the divided manifold spaces is relatively high, the air flow direction can be smoothly reversed.

(The Second Embodiment)

The fuel cell system according to the present embodiment has the same basic structure as in the first embodiment but differs in the way of controlling the air flow direction. Here, the explanation given below will focus on the difference.

In the first embodiment, voltage is detected for a plurality of cells and the air flow direction is switched according to the detected values. On the other hand, the temperature of air that has passed through the cell multilayer element is detected at the air exit and the air flow direction is switched according to the detected temperature in the present embodiment.

Figure 7:
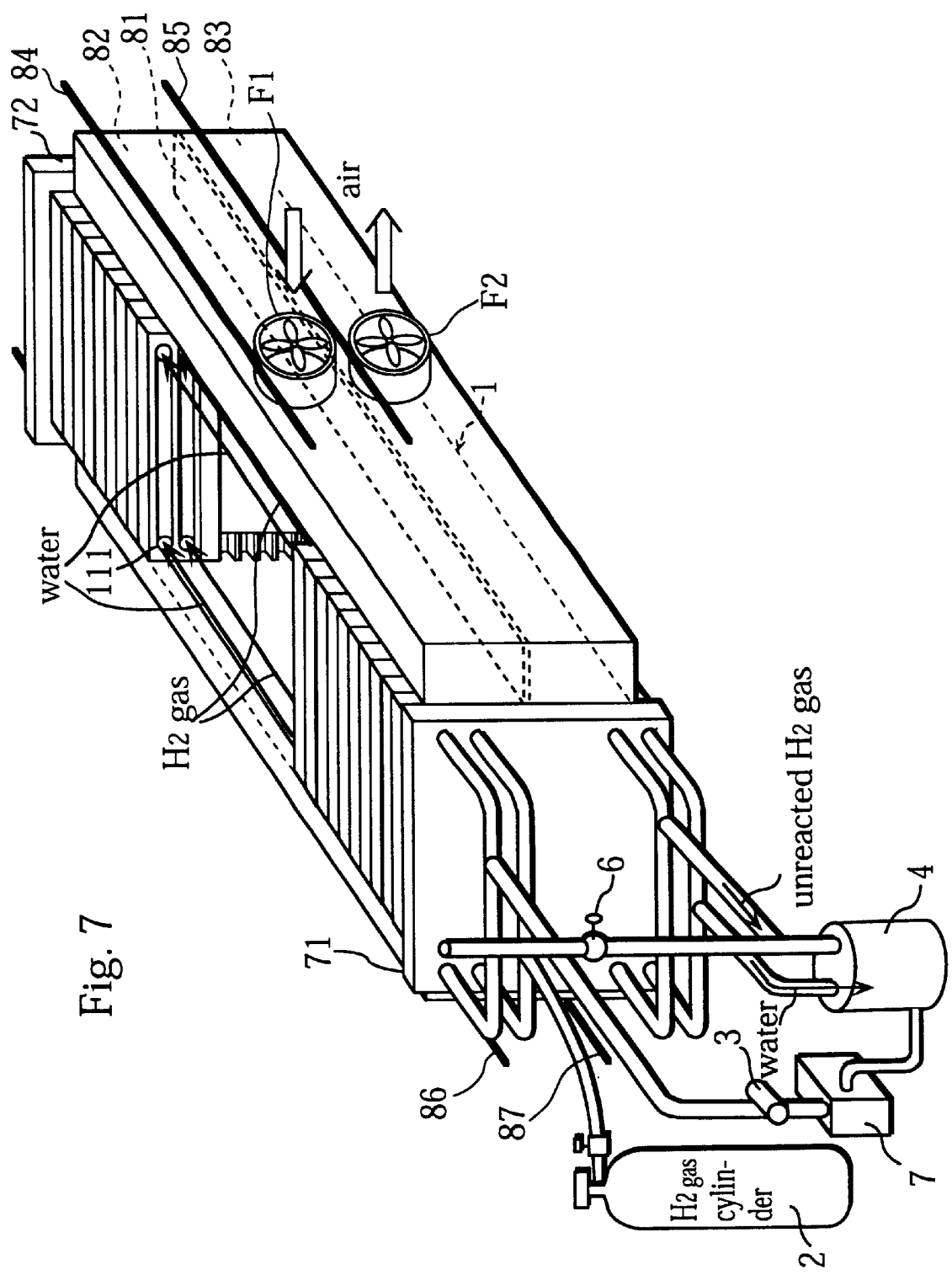
FIG. 7 is a perspective view showing the overall structure of and operations by a polymer electrolyte fuel cell system according to the second embodiment.

More specifically, four thermocouple thermometers, i.e., thermocouple thermometers 84, 85, 86, and 87 are set in spaces around the cell multilayer element where air flows from and into the cell multilayer element so as to position the top ends of the thermocouple thermometers at points in the spaces corresponding to the midpoint of the cell multilayer element in the direction of the layer as shown in FIG. 7. The representative temperature of air at the air exit is detected using the thermocouple thermometers, and the air flow direction is switched when the detected temperature reaches a predetermined temperature.

The air flow direction can be switched before the cell voltage decrease by switching the air flow direction according to the detected temperatures. In the first embodiment, since the air flow direction is switched according to the cell voltage, the cell voltage decreases to some extent in any cases. On the other hand, when the control temperature is set around a temperature at which the cell voltage starts decreasing, not only the same influences and effects as the first embodiment (preventing channels from being blocked by water, reducing air flow stagnation, and the like), but also more stable power generation can be realized.

In the present embodiment, the switching of the air flow direction is controlled by detecting the temperatures of air that has passes through the cell multilayer element at the air exit. Please note that the air flow direction can be switched according to the difference between the representative temperature at the air exit and the representative cell temperature (the average of cell temperatures at points of measurement set at every few cells) in order to stabilize the power generation when the outside air temperature is tremendously low.

(The Third Embodiment)

The fuel cell system according to the present embodiment has the same basic structure as in the first embodiment but differs in the way of controlling the air flow direction. Here, the explanation given below will focus on the difference. Note that the same influences and effects as the first embodiment (preventing channels from being blocked by water, reducing air flow stagnation, and the like) is obtained by the fuel cell system according to the present embodiment.

According to the present embodiment, the air flow direction is periodically switched according to a predetermined cycle. While the cycle can be fixed in terms of time, it is preferable to use the cycle that is defined using the fluctuant fuel cell operation condition as the parameter. More specifically, it is preferable to use the cycle that are defined by the load current of the fuel cell. In this case, the load current of the fuel cell is detected and the air flow direction is switched according to the detected load current. Here, the direct function (cycle=1/I×constant, where the load current is "I") of the inverse number of the load current can be the cycle.

The air flow direction is switched as follows. The load current is once detected and the cycle is calculated according to the detected value. Just after the air flow direction is switched in the cycle with reference to the point of time when the load current has been detected, the load current is detected again to calculate a new cycle. With reference to the point of time when the air flow direction has been switched, the air flow direction is switched in the newly calculated cycle. By repeating the detection of the load current, the calculation of the cycle, and the switching of the air flow direction, the air flow direction can be switched according to the load current. Note that the air flow direction is switched in a set cycle when the load current does not fluctuate.

When the cycle is set according to the load current as has been described, the interval between the switching can be shorter, i.e., the air flow direction can be switched in a relatively short period when the load current is high, i.e., when the temperature of the fuel cell is relatively high and the air channels tend to be blocked by the condensation and retention of the generated water. As a result, the humidity and temperature in the fuel cell can be kept still uniform. On the other hand, when the load current is low, i.e., when the fuel cell temperature is relatively low and the air channels are blocked by the condensation and retention of the generated water less frequently, the cycle is set to be longer. As a result, the cell voltage decrease can be prevented, which is temporarily caused by the switching of the air flow direction.

(The Fourth Embodiment)

The fuel cell system according to the present embodiment has the same basic structure as in the first embodiment but differs in the way of controlling the air flow direction. Here, the explanation given below will focus on the difference. Note that the same influences and effects as the first embodiment (preventing channels from being blocked by water, reducing air flow stagnation, and the like) is obtained by the fuel cell system according to the present embodiment.

Figure 8:
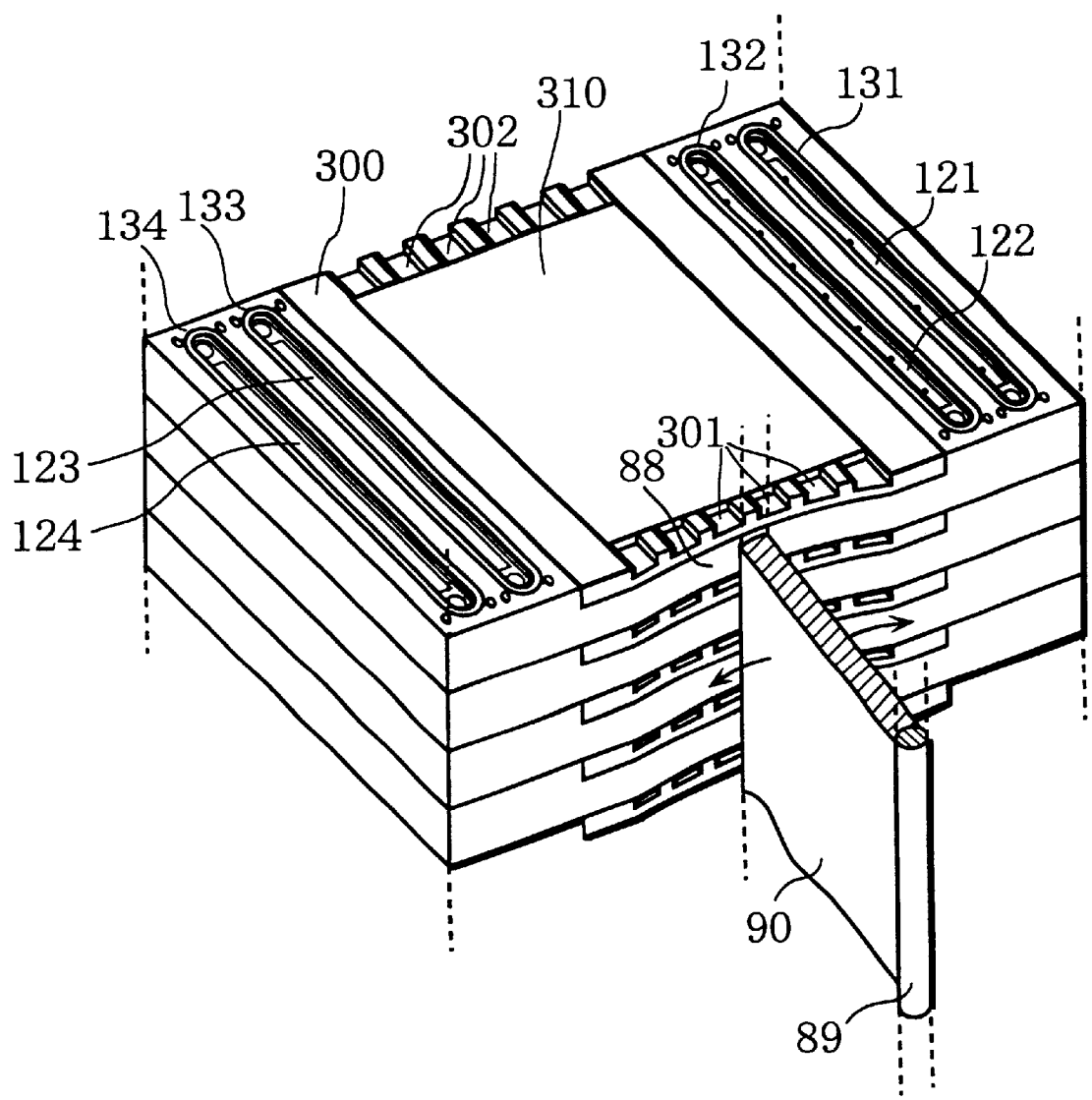
FIG. 8 is an enlarged view of a multilayer element that is cell units stacked in layers in a polymer electrolyte fuel cell system according to the fourth embodiment.

FIG. 8 is an enlarged view of the multilayer element that is cell units stacked in layers in the fuel cell system according to the present embodiment.

As shown in FIG. 8, each of the cell units in the fuel cell system according to the present embodiment has a round depressed part 88 at the entrance of the air channels 301. To the cell units, a dividing member 90 for dividing the manifold space is attached so as to come in contact with the round depressed parts 88.

FIG. 9 is a perspective view showing the overall structure of and operations by the fuel cell system according to the present embodiment.

As shown in FIG. 9, an axial rod 89 is inserted into the external manifold 80 in the direction of the length (in the direction of the cell layer) along the interior wall of the external manifold 80 and the dividing member 90 is attached to the axial rod 89 in the fuel cell system. The width of the dividing member 90 (the width in the horizontal direction in FIG. 9) is set to be almost the same as the radius of the round depressed parts 88 so that the movable end that is opposite to the end where the dividing member 90 is attached to the axial rod 89 comes into contact with the depressed parts 88. One end of the axial rod 89 is coupled to a motor 92 via a speed reducer 91. The driving direction of the motor 92 is reversed in a set cycle. The speed reducer 91 reduces the rotation speed of the motor 92 to a predetermined speed. The driving force of the motor 92 is transferred to the axial rod 89 via the speed reducer 91. The dividing member 90 is driven so as to swing using the axial rod 89 as the rotational axis while the movable end comes into contact with the depressed parts 88. In order to improve the airtightness in the manifold space, packings 89a is used where the axial rod 89 comes into contact with the external manifold so that the axial rod 89 can rotate.

As in the case of the first embodiment, the manifold space is divided into two spaces. In the present embodiment, however, the ratio between the volumes of the two spaces can be changed. More specifically, since the dividing member 90 is driven to swing, the ratio between the volumes of the first manifold space 82 and the second manifold space 83 changes according to the position of the dividing member 90. As a result, when the air flow directions by the fans F1 and F2 are fixed to be opposite in advance, air partially flows in the opposite direction in the fuel cell.

Accordingly, when the dividing member 90 moves at a certain point of time, the air flow direction is reversed only for a part of the manifold space corresponding to the move of the dividing member 90. As a result, air flow stagnates only in a part around the dividing member 90 and air stagnates in a smaller area compared with the first embodiment. The effects of preventing the voltage decrease caused by the switching of the air flow direction and of lengthen the life of the fuel cell is more remarkable compare with the first embodiment.

Here, a more detailed explanation of how the air flow direction is controlled will be given with reference to FIGS. 10A to 10D.

FIGS. 10A to 10D show how the air flow direction is controlled.

As shown in FIGS. 10A to 10D, the fan F1 is driven to pass air from the left to the right and the fan F2 from the right to the left during operation. In FIG. 10A, the dividing member 90 is positioned so as to cover the entrance of the uppermost air channel, so that air passes through the air channels from the right to the left in the cell as a whole. As shown in FIGS. 10B to 10D, the air flow direction is switched in air channels according to the move of the dividing member 90.

The dividing member 90 can move at any rotation speed when the humidity in the fuel cell is uniform.

Also, it is possible to move the dividing member 90 by a predetermined degree at predetermined intervals. More specifically, the dividing member 90 can be gradually moved according to the cell voltage that is detected as in the first embodiment and according to the temperature of air at the air exit as in the second embodiment. The air flow direction, however, can be more precisely controlled by moving the dividing member 90 in a regular cycle, so that the humidity and temperature in the fuel cell is set uniform more effectively. Here, the cycle in which the dividing element is driven can be set according to the load current on the fuel cell as in the third embodiment.

Also, the amount of air sending into the divided manifold spaces according to the ratio between the volumes of the divided manifold spaces. More specifically, as the ratio of the volume of a manifold space to the volume of another manifold space increases, the driving force for the fan corresponding to the manifold space is increased and vice versa. As a result, more appropriate amount of air can be supplied to the air channels.

Note that it is preferable to move the dividing member 90 so as to come in contact with the cell multilayer element in a state of securing the airtightness of the divided manifold spaces. For this purpose, it is preferable to position an element made of an elastic substance such as rubber at the place where the dividing member 90 comes in contact with the cell multilayer element. As the rubber, silicon rubber or EPDM (ethylene-propylene-diene rubber) is preferably used since these substances are chemically and mechanically resistant in an environment of high temperature and high humidity.

(The Fifth Embodiment)

The fuel cell system according to the present embodiment has the same basic structure as in the first and fourth embodiments but differs in the structure of the dividing element. Here, the explanation given below will focus on the difference. Note that the same influences and effects as the first and fourth embodiments (preventing channels from being blocked by water, reducing air flow stagnation, and the like) is obtained by the fuel cell system according to the present embodiment.

Figure 11:
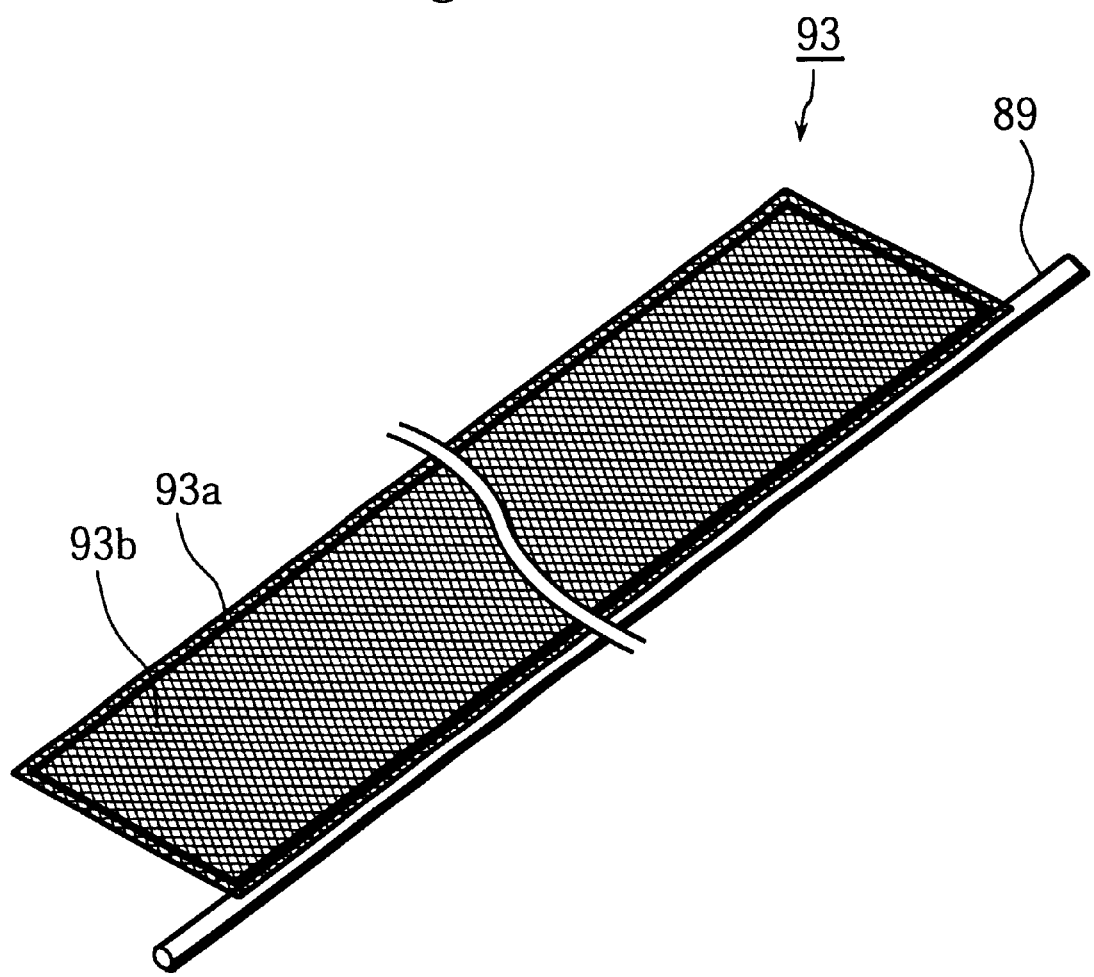
FIG. 11 is a perspective view showing a dividing element in a polymer electrolyte fuel cell system according to the fifth embodiment.

FIG. 11 is a perspective view showing a dividing member 93 in the fuel cell system according to the present embodiment.

As shown in FIG. 11, the dividing member 93 includes a frame 93a and a water-absorbing element 93b that lays across the frame 93a in a tensioned condition. The frame 93a is made of PPS and the water-absorbing element 93b is a non-woven fabric cloth made of rayon, for instance.

The dividing member 93 absorbs the condensed water that has deposited on the interior walls of the manifold spaces and dropped into the manifold spaces. The absorbed condensed water humidifies the air that flows through the cell. As a result, the air that flows through the cell can be appropriately humidified even when the amount of water supplied to the fuel cell is decreased.

(Other effects)

Here, an explanation of other effects of switching the air flow direction will be further given.

According to the conventional manner, the air flow direction is switched according to the difference between the temperatures around the entrance and exit of the oxidant channels. In this manner, the channels cannot be appropriately prevented from being blocked by the condensed water when the fuel cell is started or the load current is low, i.e., when the temperature of the fuel cell is low.

On the other hand, when the air flow direction is switched in a set cycle or according to the cell voltage or the temperature, the channels can be appropriately prevented from being blocked by the condensed water even when the fuel cell is started or the load current is low, i.e., when the temperature of the fuel cell is low.

Here, an explanation of practical examples will be given.

PRACTICAL EXAMPLE 1

As a practical example 1, a fuel cell system is manufactured according to the first embodiment.

As a comparative example 1, a fuel cell system is manufactured. The fuel cell system as the comparative example 1 includes the same cell multilayer element as the practical example 1 and an external manifold for supplying air attached on one side of the cell multilayer element. The external manifold is provided with a fan.

As a comparative example 2, another fuel cell system is manufactured. The fuel cell system as the comparative example 2 includes the same cell multilayer element as the practical example 1 and external manifolds for supplying and discharging air attached on the opposed sides of the cell multilayer element. Each of the external manifold is provided with a fan.

Note that the fuel cell systems share the specifications as follows.

electrode area: 100 cm$^2$ solid polymer film: perfluorocarbon sulfonic acid anode catalyst: platinum supported on carbon cathode catalyst: platinum supported on carbon the number of cell layers: 52 the fuel cell systems are operated for power generation. Note that air is used as the oxidant, $H_2$ is used for the fuel, the air is not humidified, and the fuel is internally humidified by directly supplying ion exchange water to the fuel cell.

current density: 0.5 A/cm$^2$ fuel utilization ratio: 95% oxidant utilization ratio: 55% condition for reversing air flow direction: cell voltage drops 10 mV from the standard cell voltage (at the drop in the first, 10th, 20th, 30th, 40th, and 52nd cell in the order of cell layer)

Figure 12:
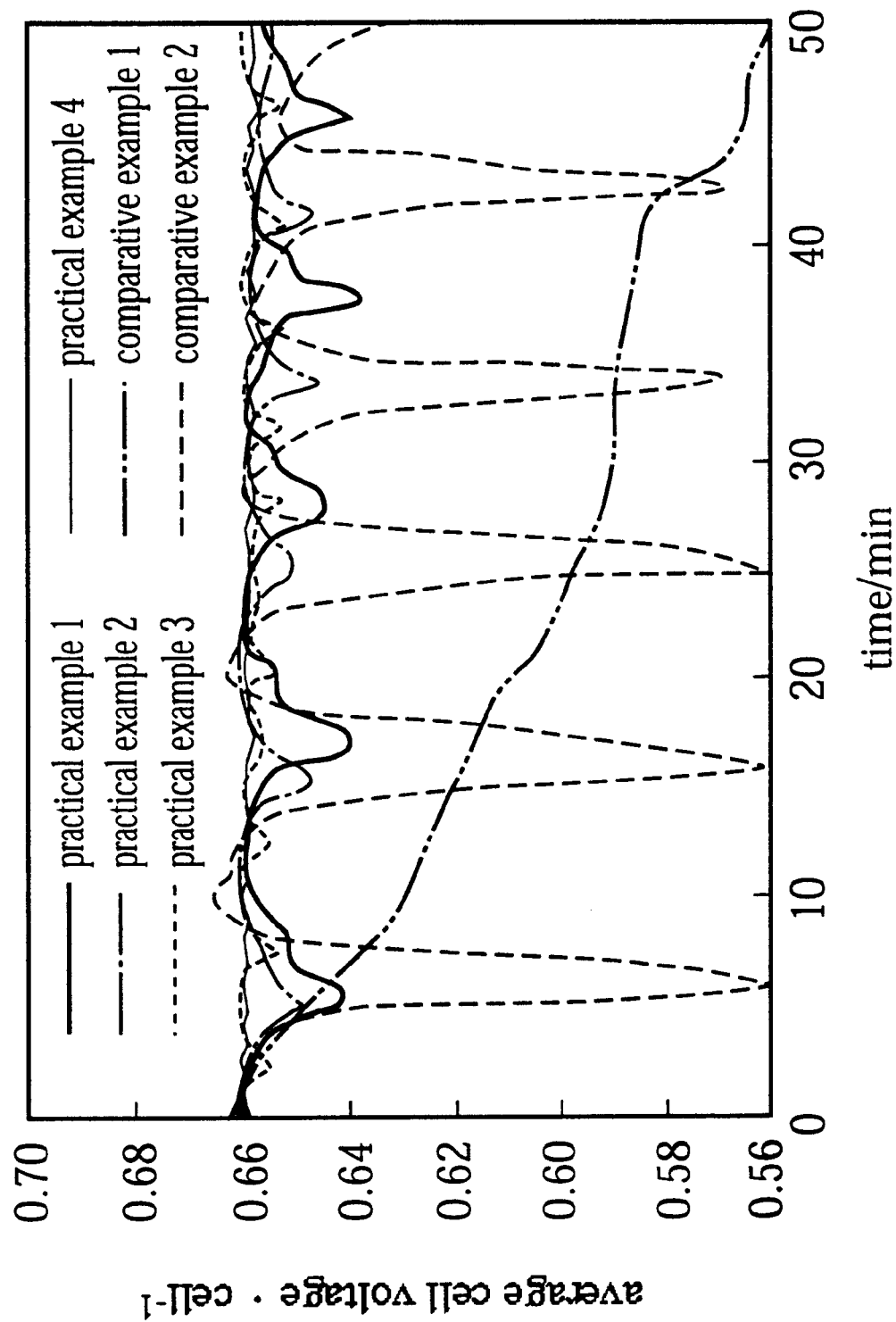
FIG. 12 is a plot showing the result of measurement of cell voltage that is the experiment result of practical examples.

The fluctuation of the cell voltage is measured during the power generating operation. FIG. 12 is a plot showing the average cell voltage over time.

As shown in FIG. 12, the cell voltage of the comparative example 1 is unstable and significantly drops over time.

As for the comparative example 2, when the cell voltage reaches at a predetermined value, the flow direction of the oxidant is reversed to have the humidity and temperature distributions in the fuel cell uniform. As a result, the cell voltage returns to the previous level. In this case, however, oxygen is temporarily deficient at the time of reverse, so that the cell voltage drastically drops for the time being.

On the other hand, although slightly fluctuates at the time of reverse, the cell voltage is stable for the fuel cell system of the practical example 1 compared with the comparative examples 1 and 2.

PRACTICAL EXAMPLE 2

As a practical example 2, a fuel cell system is manufactured according to the second embodiment. Power is generated in the same conditions as the practical example 1 and the cell voltage fluctuation is measured. The average cell voltage over time is also shown in FIG. 12.

Note that the air flow direction is reversed when the temperature detected by the thermocouple thermometers reaches at a set value. Power is generated with the set value around the temperature where the cell voltage begins to drop.

As shown in FIG. 12, power generation by the fuel cell system according to the practical example 2 is more stable compared with the fuel cell system according to the practical example 1 as has been described.

PRACTICAL EXAMPLE 3

As a practical example 3, a fuel cell system is manufactured according to the third embodiment. Power is generated in the same conditions as the practical example 1 and the cell voltage fluctuation is measured. The average cell voltage over time is also shown in FIG. 12.

Note that the direct function of the inverse number of the load current is used as the cycle to switch the air flow direction during power generation for the fuel cell system of the practical example 3.

As shown in FIG. 12, power generation by the fuel cell system of the practical example 3 is more stable than the fuel cell system of the practical example 1. This can be attributed to improved effect of uniformizing the humidity in the fuel cell since the air flow direction is switched in a relatively short cycle.

PRACTICAL EXAMPLE 4

As a practical example 4, a fuel cell system is manufactured according to the fourth embodiment. Power is generated in the same conditions as the practical example 1 and the cell voltage fluctuation is measured. The average cell voltage over time is also shown in FIG. 12. Note that the dividing member 90 is controlled so as to swing back and forth in a cycle of five minutes.

As shown in FIG. 12, although the cell voltage slightly fluctuates in the fuel cell system of the practical example 4, the cell voltage is still more stable compared with the practical example 1.

This can be attribute to extremely small cell voltage drop at the time of reverse in the fuel cell system of the practical example 4 since air is deficient in the part corresponding to only about one channel due to the air flow reverse in the practical example 4.

PRACTICAL EXAMPLE 5

As a practical example 5, a fuel cell system is manufactured according to the fifth embodiment. Power is generated in the same conditions as the practical example 4 and the amount of water supply is measured under the conditions in which the same power generation performance is delivered as the practical example 4.

As a result, the water supply amount for the fuel cell system of the practical example 5 is 350 mL/h compared with 500 mL/h in the practical example 4.

Note that the present invention is not limited to the embodiments that have been described. Other possible modifications are given below.

(1) The fan F1 can be disposed on one side of the cell multilayer element and the fan F2 can be disposed on the opposite side in the first embodiment. In this case, the first and second manifold spaces 82 and 83 are disposed on the opposite sides so as to form two air flowing areas in one cell.

(2) While the external manifold space is divided into two spaces in the first embodiment, the external manifold space can be divided into more than two spaces. The more the number of spaces, the smaller the part of the cell where the oxygen is deficient and the more efficiently the cell voltage drop can be prevented.

(3) In the first and third embodiments, the external manifold space is divided into two spaces in the direction of the cell layer of the cell multilayer element. The external manifold space, however, can be divided in the direction perpendicular to the cell layer. More specifically, the external manifold space can be divided so as not to divide the air flow direction in one cell but to divide the cells. In this case, all the air flow direction does not reversed at one time in the cell multilayer element as a whole. As a result, the number of cells where air is deficient is relatively small and cell voltage drop can be prevented.

(4) In addition, the reverse of the flow direction of air that is to be fed into the cathode has been described in the embodiments. Also, the flow direction of fuel that is to be fed into the anode can be reversed.

(5) In the embodiments, the polymer electrolyte fuel cell has been taken as an example, the present invention can be realized by the phosphoric acid type fuel cell, the direct methanol fuel cell, and the like.

(6) Any of the first to fourth embodiments can be combined in order to control the air flow direction.

As has been described, the flow direction of oxidant or fuel is switched in a part of the oxidant or fuel channels according to the fuel cell system of the present invention. As a result, blocking of the channels by condensed water can be prevented while preventing the drop of the voltage as less as possible at the time of the reverse of the oxidant and the fuel direction. Consequently, the life of the fuel system can be lengthened.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A fuel cell system comprising:
   (A) a cell multilayer element that is formed by stacking unit cell structures in layers, a unit cell structure including:
      a cell that includes a cathode, an anode, and electrolyte sandwiched between the cathode and the anode
      an oxidant channel unit with a plurality of oxidant channels that cross the cathode and enable oxidant to be supplied to the cathode; and
      a fuel channel unit with a plurality of fuel channels that cross the anode and enable fuel to be supplied to the anode;
   (B) oxidant supplying means for supplying the oxidant to the oxidant channels; and
   (C) fuel supplying means for supplying the fuel to the fuel channels, wherein
      the oxidant supplying means includes first switching means for reversing a flow direction of the oxidant in at least one, but not all of the oxidant channels and/or the fuel supplying means includes second switching means for reversing a flow direction of the fuel in at least one, but not all of the fuel channels.

2. The fuel cell system according to claim 1, wherein the oxidant supplying means includes:
   a first oxidant supplier for supplying the oxidant to a first oxidant channel group that includes at least one, but not all of the oxidant channels; and
   a second oxidant supplier for supplying the oxidant to a second oxidant channel group that includes at least one, but not all of the oxidant channels, different from the first oxidant channel group, and
   the first switching means independently reverses a direction in which the first oxidant supplier supplies the oxidant to the first oxidant channel group and a direction in which the second oxidant supplier supplies the oxidant to the second oxidant channel group.

3. The fuel cell system according to claim 1, wherein the fuel supplying means includes:
   a first fuel supplier for supplying the fuel to a first fuel channel group that includes at least one, but not all of the fuel channels; and
   a second fuel supplier for supplying the fuel to a second fuel channel group that includes at least one, but not all of the fuel channels, different from the first fuel channel group, and
   the second switching means independently reverses a direction in which the first fuel supplier supplies the fuel to the first fuel channel group and a direction in which the second fuel supplier supplies the to the second fuel channel group.

4. The fuel cell system according to claim 2, wherein the first oxidant supplier includes:
   a first fan; and
   a first connecting passage for forming an airway between the first fan and the first oxidant channel group,
   the second oxidant supplier includes:
   a second fan; and
   a second connecting passage for connecting the second fan to the second oxidant channel group, and
   the first switching means independently reverses a direction of an air current generated by the first fan and a direction of an air current generated by the second fan.

5. The fuel cell system according to claim 4, wherein the first and second connecting passages are formed by partitioning a space inside of an external manifold with a dividing element.

6. The fuel cell system according to claim 5, wherein the dividing element is provided with a water-absorbing element.

7. The fuel cell system according to claim 1, wherein the oxidant supplying means includes:
   a first oxidant supplier for supplying the oxidant to a first oxidant channel group that is only some of the plurality of oxidant channels; and
   a second oxidant supplier for supplying the oxidant to a second oxidant channel group including all the plurality of oxidant channels that are not in the first oxidant channel group, and
   the first switching means reverses the flow direction of the oxidant in only some of the oxidant channels by changing the members of the first oxidant channel group.

8. The fuel cell system according to claim 1, wherein the fuel supplying means includes:
   a first fuel supplier for supplying the fuel to a first fuel channel group that is only some of the plurality of fuel channels; and a second fuel supplier for supplying the fuel to a second fuel channel group that is the plurality of fuel channels excluding the first fuel channel group, and the second switching means reverses the flow direction of the fuel in only some of the fuel channels by changing the members of the first fuel channel group.

9. The fuel cell system according to claim 7, wherein the first oxidant supplier includes:

a first fan; and a first connecting passage for forming an airway between the first fan and the first oxidant channel group, the second oxidant supplier includes:

a second fan; and a second connecting passage for connecting the second fan to the second oxidant channel group, and the first switching means reverses the flow direction of the oxidant in only some of the oxidant channels by changing volumes of the first and second connection passages.

10. The fuel cell system according to claim 9, wherein the first and second connecting passages are formed by partitioning a space inside of an external manifold with a dividing element, and the first switching means changes the volumes of the first and second connection passages by moving the dividing element.

11. The fuel cell system according to claim 10, wherein the dividing element is provided with a water-absorbing element.

12. The fuel cell system according to one of claims 4 and 10, wherein the directions of the air current generated by the first and second fans are reversed and the dividing element is moved according to one of a cell voltage, a temperature of the oxidant at exits of the oxidant channels, a difference between the oxidant temperature at the exits and a cell representative temperature, and a load current.

* * * * *